United States Patent [19]

Graham

[11] 4,409,831

[45] Oct. 18, 1983

[54] LIQUID LEVEL INDICATOR APPARATUS

[75] Inventor: Edward F. Graham, Cleveland, Tenn.

[73] Assignee: Olin Corporation, New Haven, Conn.

[21] Appl. No.: 344,418

[22] Filed: Feb. 1, 1982

[51] Int. Cl.$^3$ .............................................. G01F 23/00
[52] U.S. Cl. ................................................ 73/290 R
[58] Field of Search ................. 73/302, 299, 290 R, 73/294, 298, 73, 303; 116/227; 210/416.2, 416.3, 461, 462

[56] References Cited

U.S. PATENT DOCUMENTS 535,167  3/1895  Kotz .................................... 210/462
2,001,853  5/1935  Seward ................................ 73/302
2,526,192  5/1945  Battles et al. ....................... 73/299

Primary Examiner—Charles E. Frankfort
Assistant Examiner—David R. Schuster
Attorney, Agent, or Firm—Ralph D'Alessandro; Donald F. Clements; Thomas P. O'Day

[57] ABSTRACT

An apparatus for measuring the liquid level adjacent the bottom of a slurry vessel is provided with a liquid level indicator that works in conjunction with a flow conduit which passes through a container with an imperforate side surface that covers a first open-topped fluid retaining container to permit the liquid within the slurry vessel to enter the open-top first fluid retaining container and the flow conduit in response to the level of liquid within the slurry vessel.

7 Claims, 3 Drawing Figures

LIQUID LEVEL INDICATOR APPARATUS

BACKGROUND OF THE INVENTION

The present invention relates generally to brine saturator tanks used in conjunction with electrolytic cells. More particularly, the invention relates to the liquid level indicator apparatus used in such brine saturators to indicate the level of liquid within the brine saturator tank.

Commercial cells for the production of chlorine and alkali metal hydroxides have been continually used and developed from about 1892 to the present. Regardless of the type of cells employed in this production, the process requires the use of a saturated brine solution. Generally depleted brine is removed from the chlor-alkali cells and replenished in a brine saturator tank by the addition of fresh water and rock salt. The salt, fresh water and depleted brine is allowed to mix together to form a slurry.

Naturally, the entire electrolytic process is dependent upon having a sufficient amount of saturated brine to be electrolyzed within the cells. Thus, devices have been designed to monitor the liquid or brine solution level in the saturator tanks. However, the liquid level monitoring or indicating devices have proven susceptible to plugging from insolubles such as lime, sand, and salt particles, found in the solution. Since the rock salt normally is added directly into the top of the tank or saturator vessels, there has also been a problem with the brine or liquid level sensing apparatus breaking from the weight of the rock salt which is normally gravity fed on top of the apparatus in the saturator vessel.

Should the level indicator apparatus plug with insolubles or break, the level of the fluid in the saturator will not accurately be reflected. This could cause the liquid level in the saturator vessel to become too low or even be exhausted. This would obviously affect the operation of the electrolytic cells serviced by the saturator vessel. Should the level of saturated brine drop too low, the pumps circulating it through the brine system to the cells could cavitate and cause the entire system to be depleted of brine. In such instances, the entire bank of electrolytic cells fed brine from the affected brine saturator tank or vessel must be shutdown until there is sufficient pressure built up again in the pumps to recommence operation. At a minimum, this can take several hours since it is necessary to refill the slurry vessel with make up water. If the level indicator apparatus is plugged or broken, it can take several days to clear away the built up pile of rock salt that may cover the apparatus and to unplug or repair the apparatus. On the other extreme, the plugging of the level indicator apparatus could call for the addition of excessive amounts of fresh water by an automatic water make up system to respond to an erroneously low indication of liquid. This could lead to flooding of the slurry vessel and the general cell area.

These problems are solved in the design of the present invention which provides an improved liquid level indicator apparatus which may be utilized in any type of electrolytic cell requiring a salt for electrolysis.

SUMMARY OF THE INVENTION

It is an object of the present invention to provide in a brine saturation system improved level indicator apparatus that is less susceptible to breakage from the rock salt being used to saturate the brine and plugging from insolubles normally found in the brine solution.

It is another object of the present invention to provide a liquid level indicator apparatus that is relatively simple, low in cost, and still reliable for use in a brine system with electrolytic cells.

It is a feature of the present invention that a generally vertically extending portion of a saturated brine fluid level sensing line or flow conduit extends within a closed-topped retainer with an imperforate side surface adjacent its bottom.

It is another feature of the present invention that a saturated brine fluid level sensing line or flow conduit further extends into an open-topped liquid container that is within the closed-topped container to permit the liquid level within the saturator vessel to be accurately read.

It is an advantage of the present invention that clogging or plugging of the liquid level apparatus is avoided.

It is another advantage of the present invention that the liquid level indicator apparatus need only be cleaned at its regularly scheduled maintenance times when the brine saturator tank is normally drained, although the level of insolubles in the slurry vessel may exceed the height of the liquid level indicator.

These and other objects, features, and advantages are obtained in liquid level indicator apparatus having a flow conduit extending into a slurry vessel to which is connected a liquid level indicator external of the vessel such that the flow conduit extends into an open-topped first fluid retaining container which is placed within and under a second closed-topped container with an imperforate bottom side surface to permit the liquid to enter the second container and the first fluid retaining container when the liquid in the slurry vessel is above the predetermined height of the first fluid retaining container to permit the liquid level indicator to indicate the liquid level in the slurry vessel.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
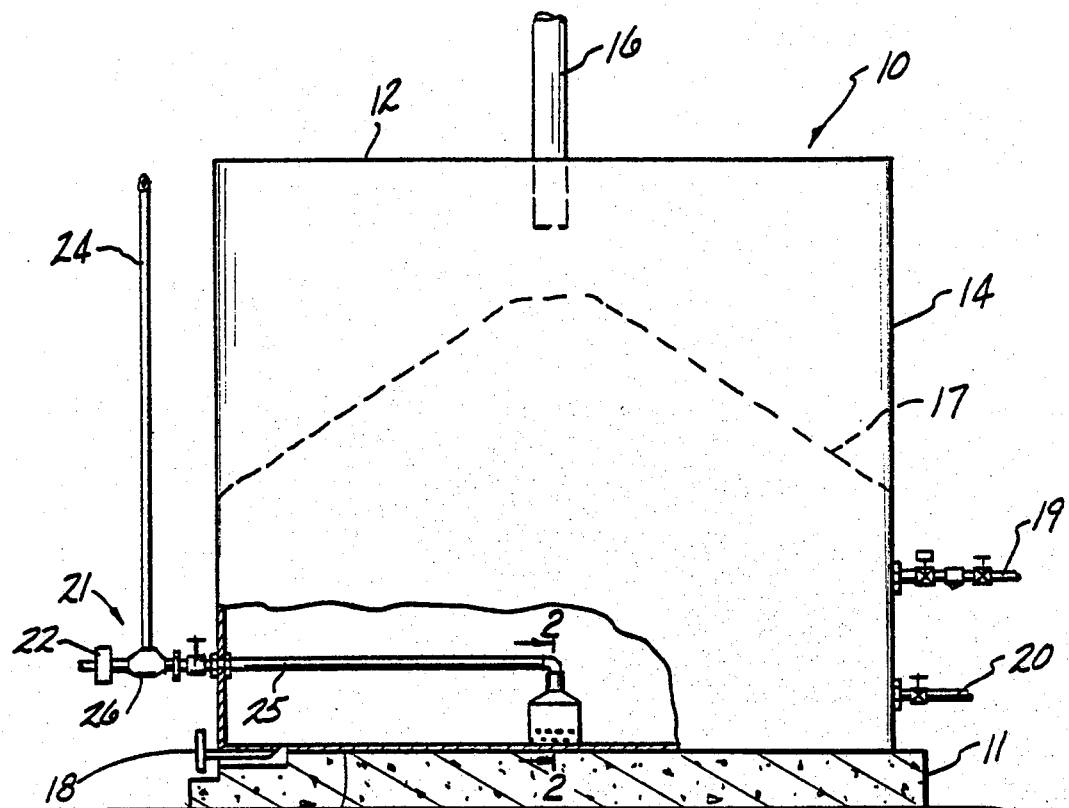
FIG. 1 is a side elevational view of a slurry brine saturator tank or vessel.

Referring to FIG. 1 there is seen a slurry vessel or brine saturator tank, indicated generally by the numeral 10. Vessel 10 is generally cylindrical in shape and is mounted upon a reinforced concrete foundation 11. Vessel 10 has a top 12, a side surface 14, and a bottom 15. Top 12 has an opening (not shown) through which a rock salt chute 16 (partially shown) passes to provide a delivery system for rock salt from the salt storage silo above the vessel 10. The rock salt is gravity fed and builds up within the vessel 10 forming a pile 17 that is mixed at its bottom with depleted brine and fresh water to form the brine used in the electrolytic cells serviced by the brine processing apparatus.

Various pipes and conduits enter and exit the vessel 10. A side bottom drain pipe 18 is provided from the bottom of the vessel 10 to permit the vessel 10 to be drained when necessary. A fresh water inlet conduit 19 passes through the side surface 14 in the vessel 10 to provide fresh make-up water to mix with the rock salt pile 17 to form the concentrated brine slurry. Fresh water inlet conduit 19 has appropriate shutoff valves and check valves in its line. A brine outlet conduit 20, positioned below the fresh water inlet conduit 19, serves to convey the concentrated brine solution from the vessel 10 to the electrolytic cells for use in the electrolytic process. Conduit 20 also has shutoff valves appropriately positioned along its length.

A liquid level indicator apparatus is indicated generally by the numeral 21 and passes through the side surface 14 of vessel 10. Level indicator 22 is mounted on a horizontal fluid flow conduit 25 adjacent the generally vertically extending overflow conduit 24. The horizontal fluid flow conduit 25 connects to the vertically extending conduit 24 through union 26 and extends generally horizontally through the side surface 14 into the vessel 10. The generally horizontally extending flow conduit 25 connects via an appropriate elbow to a generally vertically extending flow conduit portion 28 and connects on the bottom of the vessel 10 to the fluid retaining containers to be discussed in detail hereinafter.

Figure 2:
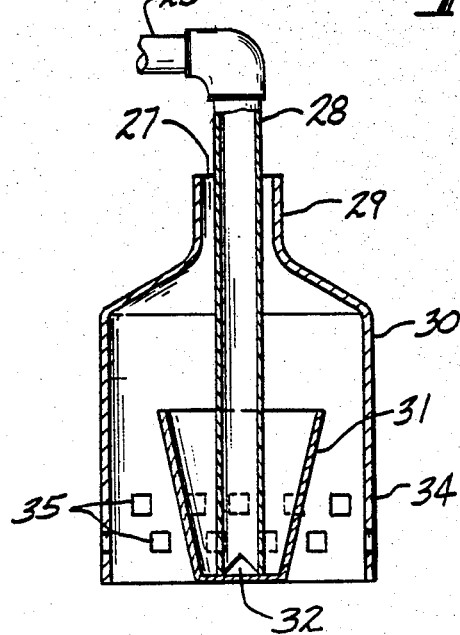
FIG. 2 is an enlarged sectional view of the liquid level sensing apparatus taken along the line 2—2 of FIG. 1.
Figure 3:
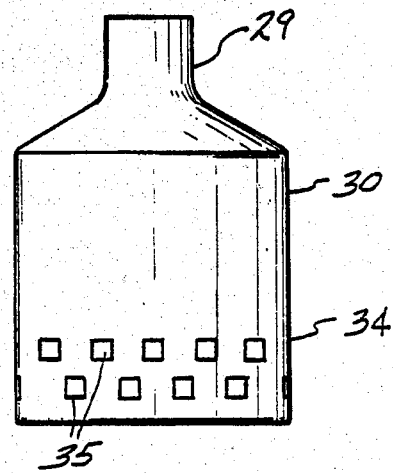
FIG. 3 is an enlarged side elevational view of the second open-topped container having an imperforate side surface.

As best seen in FIG. 2, the flow conduit portion 28 enters through the top portion 29 of a second container 30 and then passes into an open-topped fluid retaining container 31. The flow conduit portion 28 extends to the bottom of container 31 and has at least one V-notch 32 at its base to permit liquid to enter the conduit and permit the conduit to rest on the bottom of the container 31 to thereby directly support the flow conduit 25. Container 31 is positioned within the second container 30 by placing the partially bottomed second container 30 over the top of container 31. The bottom (not shown) of second container 30 has a centrally located opening through which the container 31 is placed. Flow conduit 28 is passed through an appropriately sized and shaped aperture 27 which is centrally located in the top portion 29 of container 30 by a silicone rubber sealant (not shown). The top portion 29 is generally bell-shaped. The bottom portion 34 of the container 30 is perforated, having perforations or holes 35 about its surface to permit the liquid in the vessel 10 to enter the container 31, as best seen in FIG. 3. The side surface 14 is generally cylindrically shaped from adjacent the top portion 29 to the bottom portion 34.

The flow conduits 19, 20, and 25 are generally made of CPVC, or other appropriate material, and are either 2 or 3 inches in diameter as appropriate. Containers 30 and 31 can be made of any appropriate material, such as fiberglass, to resist corrosion from the brine. Second container 30 is approximately 12 inches in height, while the container 31 is approximately 6 inches in height. Container 30 typically has been made of hand made fiberglass and is available from Tenn Plast Engineering of Memphis, Tenn. Container 31 could be as much as 6 inches in diameter at its widest portion.

In operation, the brine solution is fed into the electrolytic cell through the brine outlet conduit 20. The brine saturator tank or slurry vessel 10 replenishes the brine by having rock salt enter from a salt storage silo above the vessel 10 via the chute 16. The rock salt normally falls in a pile 17 and is mixed with fresh water conveyed into the vessel 10 via the fresh water inlet conduit 19 to form the concentrated brine. The concentrated brine is conveyed out of the vessel 10 via the brine outlet conduit 20. The liquid level indicator apparatus 21 of the instant invention permits the liquid level in the tank to be accurately determined by the use of appropriate level indicator means 22. The indicator means 22 can be any of a variety of appropriate instruments, such as a differential pressure cell made by the Foxboro Company of Foxboro, Mass. The combination of the fluid retaining container 31 within the second container 30 prevents the liquid level sensing pipe or vertically extending flow conduit portion 28 from becoming plugged with insolubles such as lime, sand, or salt particles which normally accumulate during the saturation process. Additionally, the generally vertically extending flow conduit portion provides strength to the conduit 25 which prevents its breaking from the weight of the rock salt pile 17.

The water within the bottom of the slurry vessel 10 enters the second container 30 through the holes or perforations 35 about the side surface 14. This allows the liquid level to rise up over the top of the predetermined height of the first fluid retaining container 31 which is open-topped. The liquid enters in the container 31 and rises up through the generally vertically extending flow conduit portion 28 to a level determined by the liquid level depth within the slurry vessel 10. This permits a continuous and generally accurate reading to be obtained from the liquid level indicator apparatus 21 during the periods that the brine saturator tank or vessel 10 is in operation because the insolubles are prevented from building up inside the fluid retaining container 30. Thus, the liquid entering the container is essentially clarified or free of the insolubles.

It should be noted that the pipes and conduits flowing into vessel 10 in the drawings do not show a brine recycle line directly. The recycle line may either feed in separately or may be mixed with the fresh water in the fresh water inlet prior to entering the vessel.

Further, it should be noted that the sides of container 31 can be either straight or angled.

While the preferred structure in which the principles of the present invention have been incorporated is shown and described above it is to be understood that the invention is not to be limited to the particular details thus presented, but in fact, widely different means may be employed in the practice of the broader aspects of this invention. The scope of the appended claims is intended to encompass all obvious changes in the details, materials, and arrangement of parts which will occur to one of skill in the art upon a reading of the disclosure.

Having thus described the invention, what is claimed is:

1. Apparatus for use in measuring the liquid level adjacent the bottom of a slurry vessel comprising:
   a. a fluid-flow conduit extending into the vessel and having a lower portion positioned generally vertical therein and terminating in an open end adjacent the bottom of the vessel;
   b. a liquid level indicator connected to the conduit outside of the vessel;
   c. an open-topped, first fluid container having a bottom and sides that extend upwardly from the container bottom to a predetermined height, said container extending about the lower portion of said conduit and having the bottom thereof juxtaposed to the open end of said conduit; and d. a second container having a top portion sealingly fastened to and fitting about the open-ended conduit and a bottom portion, the second container further contacting the bottom of the slurry vessel with its bottom portion and having a side surface connecting the top portion and the bottom portion, the side surface further being perforated adjacent the bottom portion at a height less than the predetermined height of the first fluid retaining container to permit liquid to pass therethrough and enter the first fluid retaining container when the liquid in the slurry vessel is above the predetermined height of the first fluid retaining container to permit the liquid level indicator to indicate liquid levels in the slurry vessel above the predetermined height whereby said containers prevent said conduit from becoming plugged with insolubles.

2. The apparatus according to claim 1 wherein the bottom portion of the second container further has a centrally located opening through which the first fluid retaining container is placed.

3. The apparatus according to claim 1 wherein the top portion of the second container further is generally bell-shaped and the side surface is generally cylindrical from adjacent the top-portion to the bottom portion.

4. The apparatus according to claim 3 wherein the generally vertical lower portion of the fluid-flow conduit enters the top portion of the second container centrally.

5. The apparatus according to claim 3 wherein the generally vertical lower portion of the fluid flow conduit touches the bottom of the first fluid retaining container and is V-notched adjacent to said bottom.

6. The apparatus according to claim 3 wherein the fluid flow conduit comprises said generally vertical lower portion and a generally horizontal portion, the generally horizontal portion being connected to the liquid level indicator and extending into the slurry vessel unit it meets said generally vertical lower portion.

7. The apparatus according to claim 6 wherein the liquid level indicator further comprises a pressure differential cell.

* * * * *